United States Patent [19]

Smits et al.

[11] Patent Number: 4,728,683

[45] Date of Patent: Mar. 1, 1988

[54] SURFACE DRESSING OF ROADS

[75] Inventors: Jozef A. F. Smits, Aartselaar, Belgium; Marc P. Plaindoux, Bois Guillaune, France

[73] Assignee: Exxon Research & Engineering Co., Florham Park, N.J.

[21] Appl. No.: 875,233

[22] Filed: Jun. 13, 1986

Related U.S. Application Data

[63] Continuation of Ser. No. 722,897, Apr. 12, 1985, abandoned.

[30] Foreign Application Priority Data

Apr. 13, 1984 [GB] United Kingdom ................. 8409635

[51] Int. Cl.$^4$ .............................................. C08L 31/00
[52] U.S. Cl. ........................................ 524/68; 524/69; 524/70; 404/82; 404/81; 404/31
[58] Field of Search ............... 404/82, 81, 31; 524/69, 524/68, 70

[56] References Cited

U.S. PATENT DOCUMENTS

| | | | |
|---|---|---|---|
| 3,442,841 | 5/1969 | Adelman | 524/49 |
| 3,896,069 | 7/1975 | Kosaka et al. | 524/69 |
| 3,900,439 | 8/1975 | Kay | 524/69 |

FOREIGN PATENT DOCUMENTS 0078122 5/1983 European Pat. Off. .
2138008 10/1984 United Kingdom .

*Primary Examiner*—Melvyn I. Marquis
*Attorney, Agent, or Firm*—J. F. Hunt

[57] ABSTRACT

Ethylene-vinyl acetate copolymers having a melt index of 700–10,000 and a vinyl acetate content of from 1–40% by weight (based on the copolymer) are used as components of bituminous binder compositions for the surface dressing of roads to improve the temperature range of their operability, the particular EVA's are also found to have good compatibility with the types of bitumen used.

4 Claims, 3 Drawing Figures

SURFACE DRESSING OF ROADS

This is a continuation of application Ser. No. 722,897, filed Apr. 12, 1985, now abandoned.

This invention relates to the surface dressing of roads, and particularly but not exclusively to binder compositions for road surface dressings which include bitumen and certain ethylene-vinyl acetate (EVA) copolymers, and methods of applying such binder compositions to road surfaces.

The surface dressing of a road is the uppermost layer which is exposed to traffic to provide a wearing and waterproof layer and is not the principal load bearing layer of the road which is generally provided by the hot mix of asphalt and aggregate provided underneath the surface dressing. In this hot mix the aggregate is totally incorporated in the binder which may be a bitumen. The surface dressing generally comprises a layer of binder (consisting of or incorporating bitumen) in which chippings are embedded and from which the chippings stand proud to contact the wheels of the vehicles. Typically in the repair and resurfacing of roads, such dressings are applied by first depositing a layer of binder on the existing worn surface course, and then scattering the chippings and rolling the surface. For some applications a "single" operation involving application of binder followed by application of chippings is employed, whereas sometimes a "double" operation technique is used. In this the binder composition is applied to the road surface, followed by large-sized chippings; thereafter further binder composition is applied followed by smaller-sized chippings.

The binder is in liquid form when applied, and subsequently solidifies at ambient temperature to form, with the chippings, a hard surface dressing which will take the force of moving vehicles without undue wear or deformation. Conventionally the binder layer is applied as a liquid by one of several techniques, each of which is employed to apply the binder at acceptable viscosity to the road surface. Thus, the hot spray method employs heat and optionally a fluxant to reduce the viscosity of the binder; typically application temperatures of 140° C. and above are used. The cut-back method employes a relatively high proportion of fluxant, e.g. about 15%, to reduce viscosity and application is at a temperature of about 80°-100° C. A more recent technique is that where the bituminous binder is applied to the surface to be treated at relatively low or even ambient temperature in the form of a low viscosity emulsion with water (e.g. 30-80%) and optionally a fluxant.

The quality of surface dressings required depends on the nature of the road to which they are applied. Thus road surfaces which are subject to high stresses, such as at roundabouts, require very strong binders, and hitherto expensive binder compositions comprising epoxy compounds and bitumen have been used. Somewhat less durable binders are required for road surfaces which simply have steep cambers, and hitherto bitumen modified with rubbers such as styrene-butadiene-styrene (SBS) block copolymers has been used. Both of these binder compositions have relatively high cost.

Conventional "normal quality" binders which are used for the major proportion of road surfaces, and hence in large volumes, have hitherto generally comprised bitumen alone, although in some cases the binder has also included an aliphatic solvent such as kerosene to facilitate handling and application to the road base surface. Some conventional "normal quality" surface dressing binder compositions have also included additives such as SBS in admixture with the bitumen, although these have had to be chemically reacted to improve compatibility of the rubber with the bitumen, or low melt Index EVA's which can give a small improvement in the properties of the dressing.

Problems encountered with road surface dressings are generally associated with a reduction of expected lifetime, primarily due to the nature of the traffic passing over the road. Heavy traffic is very detrimental to surface dressings. Typically, dressing lifetime is reduced because of indentation of the surface layer particularly by the chippings especially at high temperures; because of ageing of the binder; and because chippings are pulled out of the binder. This latter problem generally arises if the binder becomes brittle at low temperature, or shows a lack of adhesion to the chippings or to the base road surface. A desideratum is, therefore, a binder composition which exhibits high cohesion at high temperature, resistance to low temperatures, and high stiffness.

It has been proposed in for example U.S. Pat. No. 3,442,841 and German Patent No. 1298282 that the softening point of Asphalt may be raised by incorporation of a Low melt flow index ethylene vinyl acetate copolymer which can also increase the penetration ratio. Various modifications to these types of compositions are described in United Kingdom Patent Nos. 1390517, 1385292, 1457955 and 1534183 and European Patent Application No. 0064630 and German Patent Application Nos. 1807071, 1910178, 1962640, 2353439 and 2441203 all of which also use the low melt index copolymers. Various EVAs of this type have also been used commercially in combination with bitumen in road surface uses.

It is important that materials used to modify the bitumen used in such binders be readily miscible, i.e. compatible with the bitumen and with any solvents or fluxants which may also be incorporated and in particular do not have an undesirable tendency to cause the asphaltenes to separate out as solid lumps. It is also desirable that any additive may be used over a range of bitumens having different asphaltene contents. Generally the harder the bitumen the higher the asphaltene contents' hardness, measured by the penetration in tenths of a millimeter of a needle weighted with a mass of 100 grams for 5 seconds at 25° C. according to ASTM test D5.

It has now surprisingly been found that a particular class of ethylene-vinyl acetate copolymers having high melt index values is especially suitable in combination with bitumen as a binder composition for road surface dressing applications giving an increase in softening point as measured by ASTM D-36 or D-2398 and/or a lowering of the brittle point as measured by the Fraas method (IP-80). These EVAs have also been found to have improved compatibility over a range of bitumens. We have also found that the bitumens have good storage stability as compared with bitumens containing other conventional additives. Thus one aspect of the present invention provides for the use of an ethylene-vinyl acetate copolymer having a melt index of from 700 to 10,000 and a vinyl acetate content of from 1 to 40% by weight (based on the copolymer) in a binder composition for the surface dressing of roads.

A further aspect of the invention provides a method of applying a surface dressing to a road surface, in which there is applied to the road surface a binder layer of a composition comprising bitumen and an ethylene-vinyl acetate copolymer having a melt index of from 700 to 10,000 and a vinyl acetate content of from 1 to 40% by weight (based on the copolymer), and aggregate material is applied to and embedded in the binder layer.

Yet another aspect of the invention provides a binder composition for use in the surface dressing of roads comprising bitumen, an ethylene-vinyl acetate copolymer having a melt index of from 700 to 10,000 and a vinyl acetate content of from 1 to 40% by weight (based on the copolymer), and a fluxant in an amount such that the composition may be applied by spraying.

Figure 1:
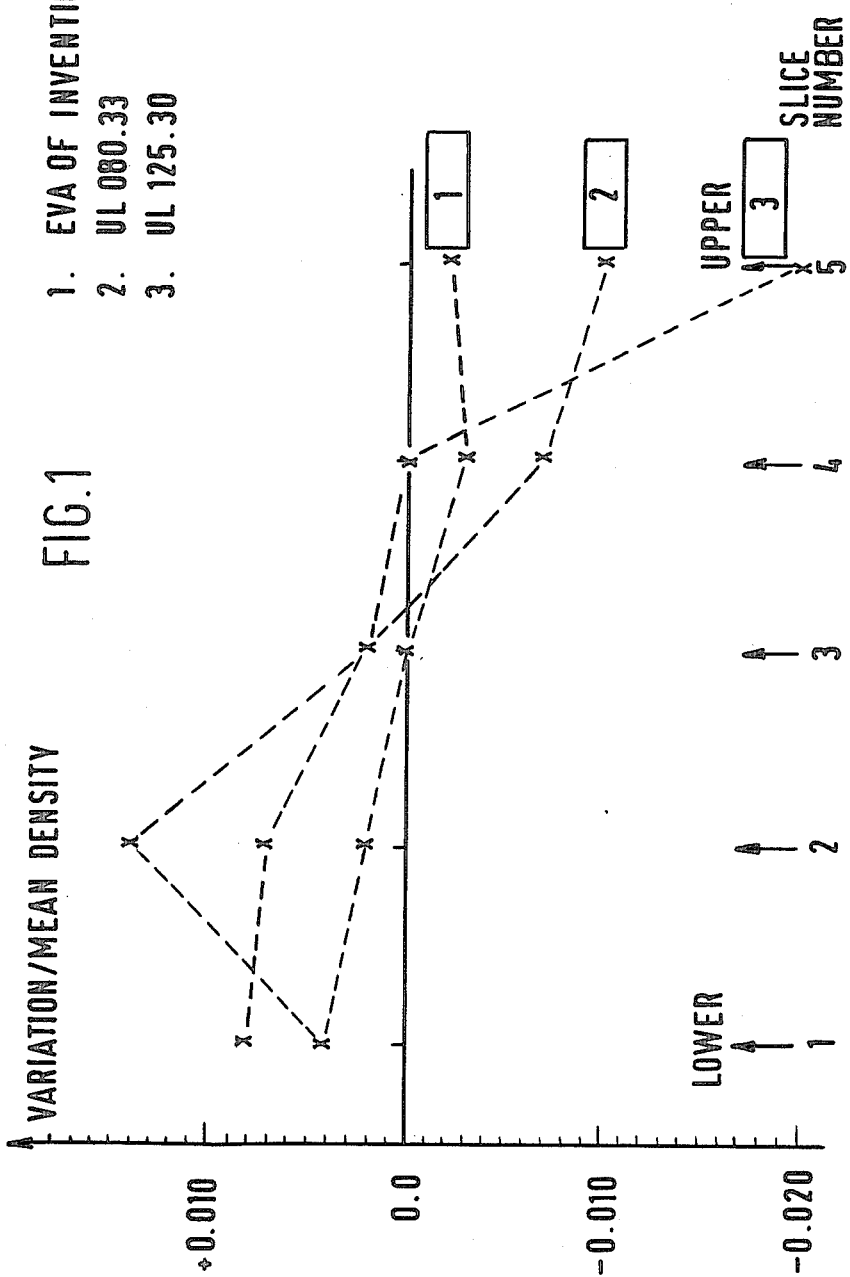
FIG. 1 is a plot of the density stability and therefore compatibility of the binder blend of the invention (1) with binder blends not according to the invention and using low melt index EVA copolymer components.

The EVA copolymers useful in the invention are disclosed in pending patent applications. Thus published European patent application No. 78122 (Exxon Research and Engineering Company), discloses, claims and discusses EVA copolymers and certain compositions comprising same which have a melt index of 700 to 10,000 and a vinyl acetate content of from 11 to 40 wt %. Certain of these EVA's were themselves considered to be novel at the priority date of EP No. 78122, viz those copolymers of vinyl acetate (VA) content 11 to 40% and melt index of 1,000 to 10,000. The melt index values mentioned herein are determined in accordance with ASTM D-1238 as discussed in EP No. 78122, and unless otherwise stated, measurement techniques, production techniques and other parameters employed in the instant application are as disclosed in EP No. 78122. It is noted that EP No. 78122 mentions the use of the EVA's claimed therein as asphalt additives, in accordance with which use, asphalt compositions such as the bitumen and aggregate materials used in hot mixes for load bearing layers in roads may be modified by the addition of the EVA. This is in contrast to the present invention which relates to the surface dressing of road surfaces, where a relatively thin layer of aggregate free binder is applied prior to application of the aggregate and the binder is modified by the addition of the EVA to widen inter alia the temperature range of operability of the surface layer of the road.

Similarly UK patent application No. 2138008 (Exxon Research and Engineering Company) discloses, claims and discusses EVA copolymers, and compositions, uses and production of same, which have a VA content of 1 to 11% by weight (based on the copolymer) and a melt index of from 1,000 to 10,000.

It has been found by the applicants that the specified EVA copolymers (hereinafter "EVAs of the invention") are particularly suitable for use in accordance with the road surface dressing applications defined hereinbefore. Preferably the EVA's of the invention have a VA content of from 10 to 30% by weight (based on the copolymer). It is preferred, too, that the melt index of the EVA's of the invention is from 1,000 to 8,000.

The EVA's of the invention have been found to have a good compatibility with the bitumen conventionally used in surface dressing applications, not only versus conventional rubbery bitumen modifiers such as SBS, but also in comparison with other EVA's not having the defined features of vinyl acetate content and melt index which characterise the EVA's of the invention. It has also been found that the EVA's of the invention have improved compatibility not only with the softer bitumens more generally used in surface dressing such as 80/100 and 180/220 penetration bitumens but also the harder bitumens with high asphaltene contents such as 40/50 penetration bitumens.

It has also been found that incorporation of the EVA's of the invention into bitumen makes this binary system itself more compatible with the conventionally added EVA's and SBS rubbers. Accordingly, in a further embodiment of the invention the binder additionally contains another EVA copolymer or a rubbery modifier such as styrene-butadiene rubber (SBR), styrene-isoprene-styrene block copolymers (SIS) or SBS, which may optionally be hydrogenated. Preferably the other modifier is used in an amount by weight about equal to the amount of EVA of the invention which is used. The preferred EVA contents mentioned herein below refer to the total rubbery modifier content of the compositions, when another modifier is present in addition to the EVA's of the invention. The use of the EVA's of the invention also allows the use of lower blending temperature (around 140° C.) than those generally required for the frequently used SBS additives where temperatures around 180° C. are frequently used.

The compatibility of the EVA's of the invention with bitumen has been demonstrated, in comparison with other EVA copolymers of different melt index, by means of a storage stability test on a binder blend comprising 80/100 penetration bitumen containing about 15 wt. % asphaltenes 64 wt. % resins and 21 wt. % oils and 5% EVA. The blends were stored for 15 hours in a test tube standing vertically at 150° C., and subsequently EVA density measurements were performed on five slices taken at intervals from the bottom to the top of the tube. The results are shown in FIG. 1, a plot of variation/mean density versus the slice number. As may be seen from FIG. 1, the binder containing the EVA of the invention shows minimal variation from the mean, whereas those containing the EVA's known as UL 080.33 and UL 125.30 show noticeable density variations on storage, indicating a poor compatibility with the bitumen. UL 080.33 is an EVA of VA content 33% and melt index (MI) 80 and UL 125.30 is an EVA of VA content 30% and MI 125; whereas the EVA of the invention is an EVA having VA content 14% and MI 2,500.

It is preferred that the binder compositions used in accordance with the invention comprise bitumen and 1 to 25% by weight of the EVA of the invention (based on the composition), more preferably from 1 to 12%, e.g. from 1 to 8 wt. % and most preferably from 3½ to 7½%, especially about 5%. The presence of the EVA's of the invention has been found to give a surprising improvement in the characteristics of the bitumen, which is particularly useful with regard to use of the binder compositions in road surface dressing applications. Thus the EVA's of the invention have been shown to raise the softening temperature of the bitumen (as measured by the ring and ball softening point) whilst at the same time lowering the brittleness temperature of the bitumen (as measured by the Fraas point). Ring and Ball softening point (R & BSP) is a standard test known in the art.

Figure 2:
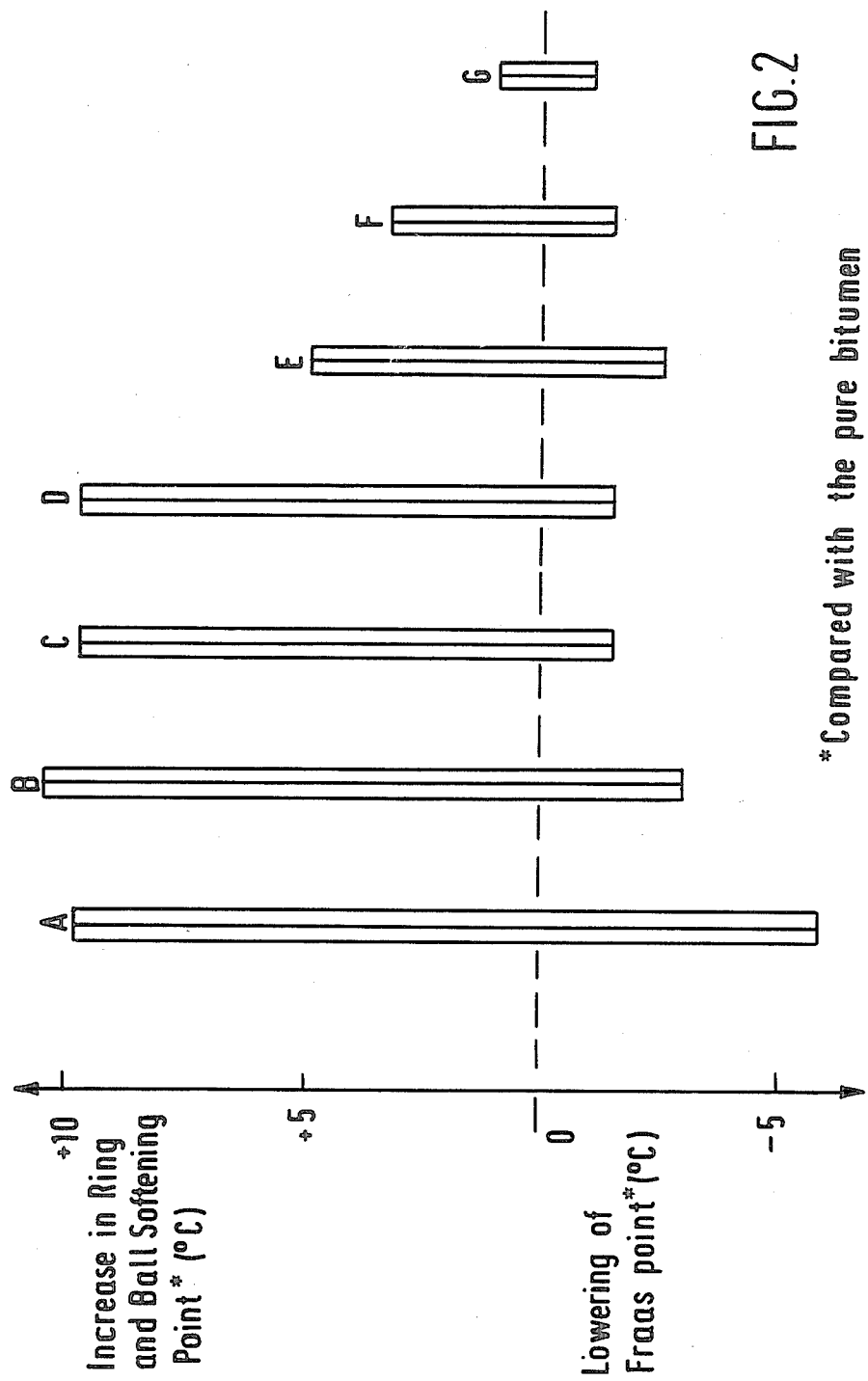
FIG. 2 is a bar graph of the increase in Ring and Ball Softening Point and the decrease of Fraas point for a binder composition of the invention (a) with binder compositions including EVA components of lower melt index.

The improvement in binder compositions including the EVA's of the invention, is shown in FIG. 2 of the accompanying drawings which shows the increase (compared with pure bitumen) in Ring and Ball Softening Point and lowering of Fraas point produced with binder compositions containing 5% EVA and the balance of the 80/100 bitumen used in the compositions used in FIG. 1. The EVA's employed to obtain the test results illustrated in FIG. 2 are as follows:

| EVA | VA % | MI | Code on FIG. 2 |
|---|---|---|---|
| EVA of the Invention | 14 | 2500 | A |
| UL 150.19 | 19 | 150 | B |
| UL 530.19 | 19 | 530 | C |
| UL 002.20 | 20 | 2 | D |
| UL 125.30 | 30 | 125 | E |
| UL 045.33 | 33 | 45 | F |
| UL 080.33 | 33 | 80 | G |

It will be seen that the EVA of the invention clearly improves the useful operating temperature range of the binder composition compared with EVA's of low MI value. In particular the low temperature (brittleness) property shows an unexpectedly good improvement for surface dressing applications.

The method of the invention, as defined, includes the application of the binder composition to the road surface. In order to facilitate such application, particularly when the spray technique is used, the binder viscosity is preferably lowered by the incorporation of a fluxant, for example an aliphatic or aromatic solvent such as the aromatic hydrocarbon fluxant SOLVESSO 200 (available from Exxon Chemical Company) or kerosene. When incorporated, the fluxant is preferably present in an amount up to 30% wt, more preferably from 1 to 15 wt %, based on the binder composition. The presence of such a fluxant enables the viscosity of the binder composition to be kept within convenient limits. For example the optimum viscosity range is less than 200 cSt at the usual temperature of application of the binder (conventionally about 140° C. or above). However by use of appropriate pumping systems, binders of much higher viscosities may be handled.

Binder compositions used in accordance with the invention preferably comprise from 45 to 99% by weight bitumen, more preferably from 77 to 99%. The actual bitumen content and grade will depend on the type of road surface to be dressed, its environment and conditions of use, and the method of application of the binder. Various bitumen grades may be used in accordance with the invention, for example bitumens with penetrations in the range 50–400, preferably 80–300 and more preferably 180–220. As noted above, other components such as other EVA's and/or SBR and/or SIS and/or SBS rubbers, optionally hydrogenated, may also be incorporated into the binder.

Also the binder compositions may be used as emulsions with water to facilitate application to the surface to be dressed. In this case the compositions may for example contain from 30–80%, preferably about 40% water and any necessary surfactants, and in addition any fluxant which is desired. The binder compositions emulsion may be produced for example by mixing the desired components (bitumen, EVA of the invention and optionally other bitumen modifiers, water, surfactant, fluxant) with stirring at, for example, about 80° C. The emulsion, which may contain for example from 1 to 5% fluxant for viscosity control, may be applied to the road surface by spraying at relatively low temperatures, e.g. about 40° C. On contact with the road surface the emulsion breaks and the water runs off. The aggregate is then applied in accordance with the method of the invention. Any remaining water content of the applied composition evaporates with time, as does the fluxant content, if any. An advantage of using the EVAs of the invention is that modified bitumen may be emulsified by normal bitumen emulsifying techniques without the need for special procedures frequently needed when using the styrene/butadiene/styrene copolymer additives.

Figure 3:
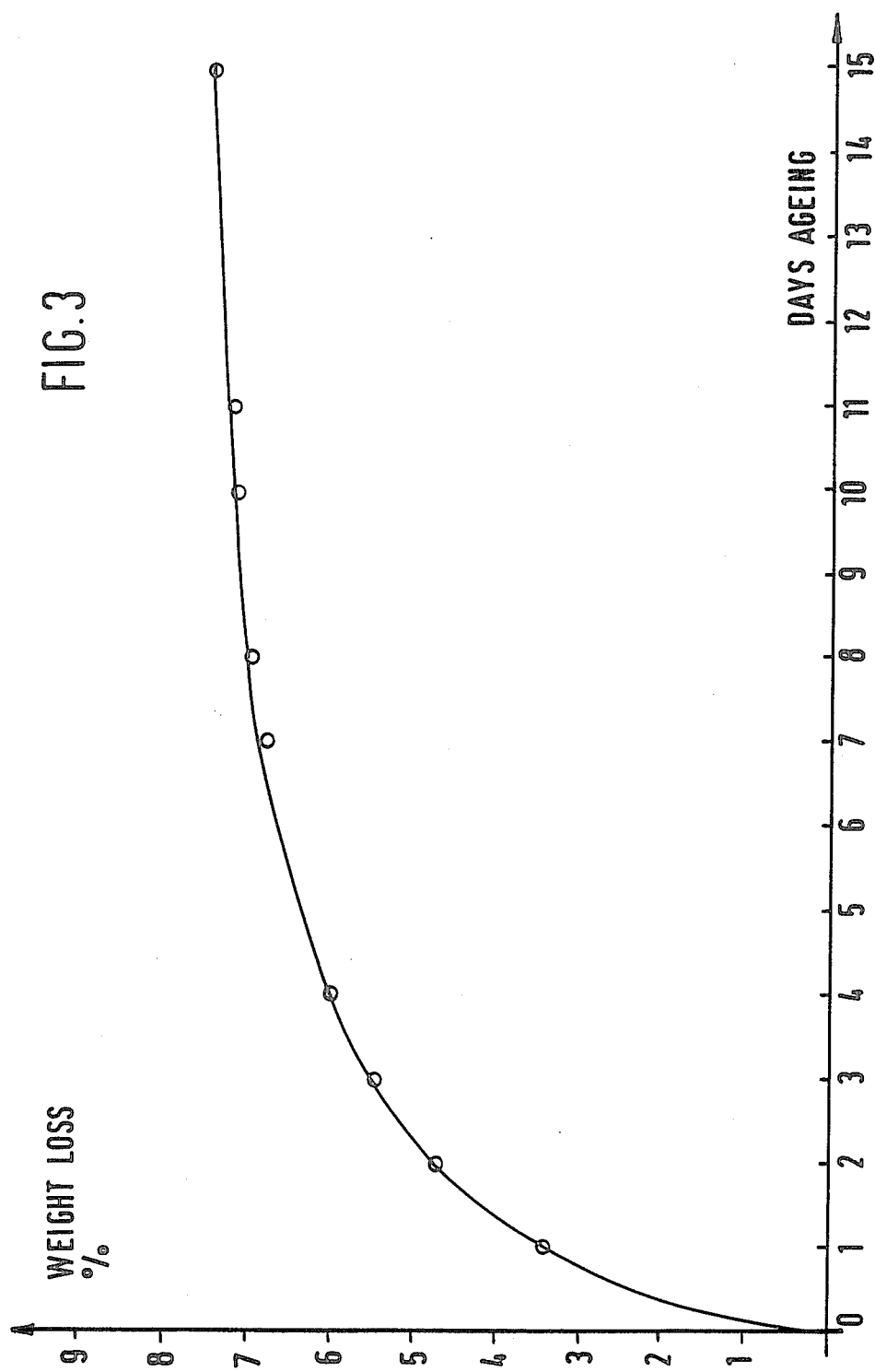
FIG. 3 is a plot of the weight loss of the binder composition of the invention over a period of time, indicating its stability.

When the binder compositions include a fluxant, this will evaporate from the dressed road surface during the first few months of use. A particularly preferred binder composition for use in accordance with the invention comprises from 85–90% 180/220 bitumen (preferably 87.4%); 3–10%, (preferably 3 to 6, more preferably 4.6%) of EVA of VA content 1–40% (preferably 14%) and MI 700–10,000 (preferably 2,500); and 4–12% (preferably 8%) of fluxant (preferably a light hydrocarbon solvent, for example the aromatic hydrocarbon solvent SOLVESSO 200 or kerosene). Such a composition has been found to perform well in simulated road surface dressing applications, and moreover to have good ageing properties (simulated by oven curing for 15 days at 50° C.). See FIG. 3. It has been appreciated that compositions which give somewhat stiff products after curing, e.g. those containing low penetration bitumen (80/100), may be upgraded in ageing characteristics by using a higher penetration bitumen e.g. 180–220.

EXAMPLE 1

A binder composition suitable for use in road surface dressings in accordance with the invention, and comprising 87.4% 180/220 bitumen containing 15 wt. % asphaltenes, 64 wt. % resins and 21 wt. % oils, 4.6% EVA of the invention containing 14 wt. % vinyl acetate and of melt index 2500 and 8% SOLVESSO 200, was produced as follows. The bitumen was heated to a temperature of 180° C., and the EVA copolymer was slowly added with stiring over a period of about 7 minutes. The two components were stirred for one hour at 180° C., and then allowed to cool to 140° C. At this temperature the fluxant was added carefully under a nitrogen stream.

The physical properties of the fresh blend were measured by conventional techniques, and the values obtained are listed in Table 1. Also included in Table 1 are the corresponding values obtained for a commercially available product. The binder composition of the invention was found to be adequate for conventional spraying. As may be seen, after curing, its physical properties were in line with the STYRELF composition, with the exception of the low temperature (−10° C.) elasticity. This, as expected, was small in comparison with the SBS rubber based product, but nevertheless shows a significant improvement over pure bitumen. It is noted that STYRELF suffers from the disadvantage that, because the SBS has to be chemically reacted with the bitumen to ensure compatibility it can only be produced in plant locations. In contrast, binder compositions of the invention may be produced in simple fashion in view of the good compatibility of the EVA's of the invention with the bitumen, if necessary at the site of use.

TABLE 1
BINDER CHARACTERISTICS

|  | Containing EVA of Invention | COMPETITIVE PRODUCT: STYRELF |
|---|---|---|
| BEFORE AGEING | | |
| VISCOSITY (cST) | | |
| 80° C. | 1545 | |
| 100° C. | 498.7 | |
| 120° C. | 199.4 | |
| 140° C. | 96.2 | |
| 160° C. | 56.1 | |
| R. and B. Softening Point (°C.) | 34 | |
| PENETRATION 100 g/5 s (mm/10) | | |
| 0° C. | 97 | |
| +10° C. | — | |
| FRAASS POINT (°C.) | <−30 | |
| FLASH POINT (°C.) | 144 | |
| AFTER CURING - (1 mm thickness) 50° C./15 DAYS | | |
| R. and B. Softening Point (°C.) | 54.8 | 57 |
| PENETRATION 100 g/5 s (mm/10) | | |
| 25° C. | 74 | 83 |
| FRAASS POINT (°C.) | −17 | −20 |
| TENSILE CURVE | | |
| 20° C. 500 mm/min | | |
| Yield point | | |
| Stress N/m2 | 1.4 10⁵ | 2.5 10⁵ |
| Elong. % | 31 | 25 |
| Break point | | |
| Stress N/m2 | 1.0 10⁴ | 1.5 10⁵ |
| Elong. % | >400 | >900 |
| −10° C. 10 mm/min | | |
| Yield point | | |
| Stress N/m2 | — | 4.8 10⁵ |
| Elong. % | — | 11.5 |
| Break point | | |
| Stress N/m2 | 1.7 10⁶ | >4.10⁵ |
| Elong. % | 6.8 | >400 |

It is considered as particularly useful and surprising that the EVA's of the invention, when used in bituminous binder compositions, especially in conjunction with a fluxant lead to products which show exceptionally good adhesion to the existing road bases (foundations, base layers or surface courses). Moreover, such binder compositions when in the form of a thin layer on the road base, receive aggregate and adhere to it in a manner which facilitates road surface dressings of desirable properties. Furthermore, the EVA's of the invention give surprisingly good compatability with bitumen and, as an especially useful characteristic, improve the compatability of other rubber modifiers with bitumen. Thus, compositions which include the EVA of the invention and another rubber modifier such as SIS, SBS or SBR in amounts such that the total of EVA of the invention and other modifier is from 1 to 25 wt. % (based on the total composition) preferably 1 to 8% and more preferably about 5%, show especially beneficial advantages in the art.

EXAMPLE 2

A composition of 87.4 wt. % of the bitumen used in Example 1 using kerosene as solvent was applied to 7 pieces of the surface of a road from a spray bar at 140° to 160° C. to apply 1½ liters per square meter to give a surface dressing between 10 and 20 millimeters thick. Stone chips of 6 mm–14 mm size according to British Standard BS-3690 were applied and rolled into the dressing. The road surface was found to perform well with all surfaces remaining in good condition after normal use throughout a hard winter.

EXAMPLE 3

Similar trials to Example 2 were carried out using an 80/100 penetration bitumen with similar results.

EXAMPLE 4

The effect of varying the concentration of the EVA of the present invention in the 180/220 penetration bitumen used in Example 2 is shown by the following results.

|  | Pure Bitumen 180/220 | Bitumen + 3.5 wt. % of Polymer of Invention | Bitumen + 5 wt. % of Polymer of Invention | Bitumen + 7 wt. % of polymer of Invention |
|---|---|---|---|---|
| Softening Point °C. | 40.0 | 41.8 | 47.4 | 55.4 |
| Fraass Point °C. | −17 | −19 | −20 | −20 |
| Penetration at 25° C. | 195 | 183 | 150 | 135 |

EXAMPLE 5

The compatibility of an EVA of the invention with various bitumens was evaluated by blending 5 wt. % of the EVA with the bitumens in the manner used in the previous examples laying down small strips of the blend and inspecting visually for separation of solid asphaltenes. No separation of asphaltenes was seen with the following three bitumens.

|  | Bitmen 1 | Bitmen 2 | Bitmen 3 |
|---|---|---|---|
| Asphaltenes | 15 wt. % | 21.3 wt. % | 23 wt. % |
| Resins | 64 wt. % | 67.2 wt. % | 65 wt. % |
| Oils | 21 wt. % | 11.3 wt. % | 12 wt. % |

We claim:
1. An aqueous emulsion for use in surface dressing of roads, comprising:
   from 30% to 80% by weight water; and
   a binder composition, wherein said binder composition comprises from 45% to 99% by weight bitumen having a penetration of from 50 to 400, and from 1% to 25% by weight ethylene-vinyl acetate copolymer having a vinyl acetate content of from 1% to 40% and a melt index of from 700 to 10,000.
2. The aqueous emulsion of claim 1, wherein said binder composition comprises from 77% to 99% by weight bitumen having a penetration of from 80 to 300.

3. The aqueous emulsion of claim 1, wherein said binder composition further comprises up to 30% by weight fluxant, wherein said fluxant comprises an aliphatic or aromatic solvent.

4. The aqueous emulsion of claim 1, wherein said binder composition comprises:

from 85% to 90% bitumen having a penetration of form 180 to 220;
from 3% to 10% by weight ethylene-vinyl acetate copolymer having a vinyl acetate content of 14% and a melt index of 2,500; and
from 4% to 12% by weight fluxant, wherein said fluxant comprises an aliphatic or aromatic solvent.

* * * * *